United States Patent [19]

Hennings et al.

[11] 4,417,227
[45] Nov. 22, 1983

[54] VOLTAGE-DEPENDENT RESISTOR AND METHOD OF PRODUCING SUCH A RESISTOR

[75] Inventors: Detlev Hennings; Axel Schnell; Herbert Schreinemacher, all of Aachen, Fed. Rep. of Germany

[73] Assignee: U.S. Philips Corporation, New York, N.Y.

[21] Appl. No.: 263,321

[22] Filed: May 13, 1981

[30] Foreign Application Priority Data

May 24, 1980 [DE] Fed. Rep. of Germany ....... 3019969

[51] Int. Cl.³ .............................................. H01C 7/10
[52] U.S. Cl. .................................................... 338/21
[58] Field of Search .................... 338/20, 21; 252/521; 361/127

[56] References Cited

U.S. PATENT DOCUMENTS

| 2,885,521 | 5/1959 | Fotland | 338/20 |
| 3,245,019 | 4/1966 | Heywang et al. | 338/20 |
| 3,764,566 | 10/1973 | Matsuoka et al. | 338/21 X |
| 4,028,277 | 6/1977 | Matsuura et al. | 252/521 X |

FOREIGN PATENT DOCUMENTS

| 2910841 | 9/1980 | Fed. Rep. of Germany | 338/21 |
| 51-77885 | 7/1976 | Japan | 338/21 |

*Primary Examiner*—C. L. Albritton
*Attorney, Agent, or Firm*—Norman N. Spain

[57] ABSTRACT

A lead germante phase, ($Pb_5Ge_3O_{11}$) is added to a ceramic sintered body formed from a polycrystalline alkaline earth metal titanate which has been doped with a small quantity of metal oxide to produce a N-type conductivity. A thin insulating layer of this germante is formed at the grain boundaries of the polycrystalline semiconducting alkaline earth metal titanate because of the formation of a liquid phase during sintering. Thus, the varistor effect is immediately available in the overall volume of the resistance body and need not first be induced by means of a forming procedure, as is the case for known resistors formed from N-doped barium titanate.

8 Claims, 6 Drawing Figures

VOLTAGE-DEPENDENT RESISTOR AND METHOD OF PRODUCING SUCH A RESISTOR

BACKGROUND OF THE INVENTION

The invention relates to a voltage-dependent resistor having a ceramic sintered body based on a polycrystalline alkaline earth metal titanate which has been doped with a small quantity of metal oxide to produce N-type conductivity, electrodes being provided on opposed parallel surfaces.

The invention further relates to a method of producing such a resistor.

Voltage-dependent resistors (denoted varistors hereinafter) are resistors the electric conductivity of which increases to a very large extent with increasing voltage at a constant temperature. This behaviour can be approximated by the following formula:

$$U = C.I^\beta$$

wherein:
I = the current through the varistor in Amps.
U = the voltage drop at the varistor in Volts
C = a constant which depends on the geometry; it indicates the voltage at I = 1 A. In practice it may assume values between 15 and some thousands.
β = the current index, coefficient of non-linearity or control factor; it depends on the material and is a measure of the slope of the current-versus-voltage characteristic.

Preferably, the β value must be as low as possible as at a low value of β pronounced changes in the current will result in only small changes in the voltage at the varistor.

The C-value chosen depends on the purpose for which the varistor is used; it determines the limit of the voltage value, and preference is given to a ceramic sintered body for which it is possible to realise in a simple way C-values over a wide range.

This is particularly possible with sintered bodies in which the non-linearity of the resistance is based on properties which are inherent in the sintered body; the C-value can here be controlled.

For varistors comprising zinc oxide as the main component and, for example, bismuth, antimony, manganese, cobalt or chromium as additives, the voltage-dependence is based on, for example, the properties which are inherent in the sintered body. As previously mentioned, this is an advantage. These varistors have, however, the disadvantage that the use of volatile components is a requirement in the production of the sintered body. These volatile components evaporate at the high temperatures which are required during sintering of the green body for the desired varistor. Particularly the volatility of bismuth has a disturbing effect and it is therefore difficult to sinter the green body during large-scale production in such a way, without considerable loss, that varistors having uniform properties can be produced. For certain uses varistors on the basis of ZnO may have the further disadvantage that at a constant voltage the power which can be converted in these varistors is limited by an operating current which increases with increasing temperature and which leads to additional heating of the component.

U.S. Pat. No. 2,885,521 discloses a non-linear resistor based on ferroelectric barium titanate, in which doping materials which produce N-type conductivity (bismuth oxide, antimony oxide or arsenic oxide) are incorporated in the perowskite lattice of the titanate. This resistor does not acquire its properties as a voltage-dependent module until a semiconducting channel has been formed by dielectric breakdown in the resistor body after a voltage has been applied. This prior art material corresponds to a very large extent to a PTC resistor, the non-linearity of these resistors being produced by these ranges of different power behaviour. For these resistors the predicted C-values cannot be reproducibly obtained.

SUMMARY OF THE INVENTION

It is an object of the invention to obviate the above-mentioned disadvantages and to provide a voltage-dependent resistor comprising a sintered body in which the non-linearity of the resistance is based on the properties which are inherent to the sintered body, which has comparatively low values of the non-linearity index and which can be sintered in a simple way in a normal atmosphere without loss of doping components and having a desired C-value within a wide range.

According to the invention, this object is accomplished by incorporating in the sintered body a very small quantity of a lead germanate phase defined by the general composition $(PbO)_x:(GeO_2)_y$ in the molar ratio x:y = 5:1 to 1:5.

Through the formation of a liquid phase the lead germanate phase, during sintereing, forms a thin insulating layer at the grain boundaries of the polycrystalline semiconducting alkaline earth metal titanate.

According to the invention, a method of producing a voltage-dependent resistor of the above-mentioned type comprises the following production steps:
(a) sintering in a reducing atmosphere a polycrystalline alkaline earth metal titanate such as $SpTiO_3$ with a metal oxide additive which functions as a doping material to produce a N-type conductivity at a temperature in the range from 1200° to 1400° C., preferably 1350° C.
(b) milling and mixing the sintered material obtained in accordance with step (a) with a lead germanate phase defined by the general formula $(PbO)_x:(GeO_2)_y$ in the molar ratio x:y = 5:1 to 1:5
(c) pressing the mixture obtained in accordance with step (b) into preforms which are suitable for a resistor,
(d) sintering in air the preform obtained in accordance with step (c), a thin insulating layer being formed during sintering from the lead germanate phase at the grain boundaries of the polycrystalline semiconducting alkaline earth metal titanate at a temperature in the range from 1050° to 1350° C., preferably 1200° C.
(e) Providing facing planes of the sintered body obtained in accordance with step (d) with metal electrodes.

The sintering operation in the reducing atmosphere makes the $SrTiO_3$ permanently semiconducting, after which it is sintered together with the highly resistive $Pb_5Ge_3O_{11}$ liquid phases. The varistor effect in $(SrTiO_3/Bi_2WO_6) + Pb_5Ge_3O_{11}$ is then directly available and need not be induced by a forming process, as required by the resistor of U.S. Pat. No. 2,885,521.

In the resistor of the invention the current flows through the overall volume of the resistor body through the semiconducting grains and the grain boundaries, at which the band structure of the applied potential is so deformed that the electric conductivity is considerably changed. This process is fully reversible and futhermore does not result in static fluctuations of the current (noise), which are unwanted in electronic circuits. The prior art resistor of the US-PS shows, for example, these static fluctuations of the current.

In further advantageous embodiments, of the invention the alkaline earth metal titanate is strontium titanate $SrTiO_3$ and the metal oxide doping material is a mixed oxide defined by the formula $(WO_3) \cdot (Bi_2O_3)_x$, x being in the range from 0.5 to 3.

Preferably, the doping metal oxide is $Bi_2WO_6$.

For example, the sintered body may consist of 65% to 95% by weight of n-doped strontium titanate, said doped strontium titanate consisting of 90% to 99.8% by weight of $SrTiO_3$ plus 0.2 to 10% by weight of $Bi_2WO_6$, and 5 to 35% by weight of $Pb_5Ge_3O_{11}$. The sintered body may, more particularly, consist of 65% to 90% by weight of doped strontium titanate, said doped strontium titanate consisting of 90 to 99.5% by weight of $SrTiO_3$ plus 0.5 to 10% by weight of $SrTiO_3$ or 0.5% to 10% by weight of $Bi_2WO_6$ and 10 to 35% by weight of $Bi_2WO_6$ and 10% to 35% by weight of $Pb_5Ge_3O_{11}$.

In accordance with a preferred embodiment, the sintered body consists of 80 to 90% by weight of a mixture of 98% by weight of $SrTiO_3 + 2\%$ by weight of $Bi_2WO_6$ and 10 to 20% by weight of $Pb_5Ge_3O_{11}$.

A particularly advantageous method of producing a voltage-dependent resistor of the type mentioned above is characterized in that it comprises the following steps:

(a) sintering a mixture consisting of 98% by weight of $SrTiO_3$ having an average grain size of 1 μm and 2% by weight of $Bi_2WO_6$ at a temperature of 1350° C. in a reducing atmosphere, (b) milling and mixing 80 to 90% of the sintered material obtained in accordance with step (a) and 10 to 20% by weight of lead germanate $Pb_5Ge_3O_{11}$, (c) pressing the mixture obtained in accordance with step (b) into tablets having a diameter of 6 mm and a thickness of 0.55 mm (d) sintering the preforms obtained in accordance with step (c) at a temperature in the range from 1150° to 1350° C. in air and (e) providing facing planes of the sintered body obtained in accordance with step (d) with CrNi-Au electrodes by means of vapour deposition.

The electrodes may be in an ohmic or a non-ohmic contact with the sintered body and may consist of, for example, gold, silver, copper, aluminum, indium, nickel, chromium or tin. The properties of the varistor do not depend essentially on the type of electrode material. The electrodes may be deposited by means of vapour deposition, metallization with a metal suspension, electro-plating, cathode sputtering or similar known methods.

The particular advantages obtained with the method of the invention are that at a temperature which is considerably lower than the sintering temperature of the alkaline earth titanate a liquid phase is already formed from the lead germanate phase, which was added to the alkaline earth titanate which had been doped with $Bi_2WO_6$. The lead germanate phase encloses the individual titanate crystals and prevents evaporation of the bismuth compound before the high temperatures which are required for sintering the titanate are reached. In this way it is possible to sinter in air at normal atmospheric pressure without the occurence of loss of material by evaporation of the doping components. This makes it possible to obtain varistors with reproducible, uniform properties.

A further advantage of the invention is that the temperature dependence of the resistance at a constant voltage can be adjusted either positively or negatively because of the composition of the sintered body and the sintering temperature.

A further special advantage of the resistors of the invention is that they do not only show the voltage dependence of the resistance but that, because of the insulating layers which formed at the grain boundaries they operate at small voltages as large-capacitance capacitors. This behaviour can be used to good advantage for the combined overvoltage and noise voltage limitation in the d.c. voltage supply of electronic circuits. This applies in particular to storage circuits whose components must be individually protected from overvoltages and noise voltages.

GENERAL DESCRIPTION OF THE DRAWING

In the drawing

FIGS. 1a to 1c show cross-sectional views of resistors according to the invention.

FIG. 2 shows the characteristic of the current-versus-voltage behaviour of a resistor according to the invention in the temperature range from 24° C. to 140° C., FIG. 3 shows in curve a: the temperature dependence of the flow of current through a resistor according to the invention with a negative characteristic, in curve b: the temperature dependence of the flow of current through a resistor according to the invention with a positive characteristic, FIG. 4 shows the characteristic of the current flow in dependence on the electric field strength for a resistor according to the invention.

DESCRIPTION OF THE PREFERRED EMBODIMENTS

The invention will now be described in greater detail with reference to the drawings.

Figures 1A, 1B:
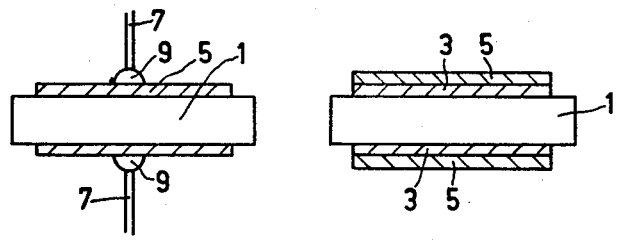
Figure 1C:
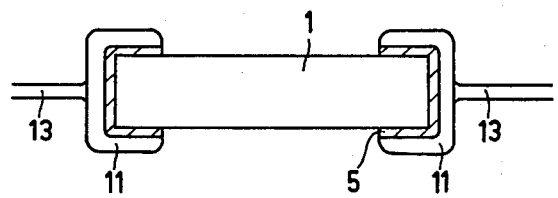

Examples of resistors of the invention are shown in FIGS. 1a to 1c of the drawing.

As shown in FIG. 1a a resistor may be of such a construction that metal layers may be provided as the electrode layers 5 of, for example, gold facing planes of a ceramic resistor body 1 whose manufacture will be described hereinafter. Thereafter, electric connecting wires 7 may be attached to the electrode layers, for example by means of soldering with solder 9.

The resistor may, however, also be soldered as a so-called chip component directly onto, for example, a printed circuit board by means of the electrode layer 5, without the provision of additional connecting wires as shown in FIG. 1b.

Referring to FIG. 1b advantageously, the resistor body 1 may first be coated on facing planes with a bonding layer 3 of alloys which are suitable for this purpose, for example, a chromium nickel alloy, whereafter each bonding layer is provided with a further metal layer, for example of gold, as the electrode layer 5. The bonding layers and the electrode layers may be deposited by, for example, vapour deposition.

For the embodiments shown in FIG. 1a or FIG. 1b the resistor body 1 has suitably a plate-shaped configuration with a round or rectangular cross-section.

The resistor body may, however, alternatively be in the form of a cylinder (see FIG. 1c), the electrode layer 5, consisting for example of gold, having been formed in known manner on the cylinder casing. Electric contacting of the resistors is effected by means of cap electrodes 11 with soldered connecting wires 13, these cap electrodes having been provided on the end faces of the resistor body 1.

There now follows the description on the basis of some examples of the fabrication of a voltage-dependent resistor on the basis of a N-doped strontium titanate.

1. Producing the SrTiO3

$SrTiO_3$ is produced from the raw materials $SrCO_3$ and $TiO_2$ (of a "pure" chemical grade) by wet-milling these materials for two hours in an agate ball mill followed by presintering for fifteen hours at 1150° C. in air. Thereafter the $SrTiO_3$ is dry-milled for 1 hour in an agate ball mill.

2. Producing the Bi2WO6 phase.

$Bi_2O_3$ and $WO_3$ (chemical quality "pro analysis") are mixed in an agate ball mill in the molar ratio 1:1 for 2 hours and thereafter fired for 3 hours at 800° C. and thereafter for 12 hours at 1000° C. The $Bi_2WO_6$ thus obtained is dry-milled for 1 hour in a ball mill.

3. Producing the semiconducting SrTiO3 powder.

$SrTiO_3$ and $Bi_2WO_6$ are wet-milled for 2 hours in an agate ball mill in the weight ratio 98:2 and thereafter fired for 4 hours at 1350° C. in a reducing atmosphere, consisting of a mixture of $N_2/H_2$ (ratio of mix 90:10). After firing the pulverized material is wet-milled in an agate ball mill.

4. Producing a voltage-dependent resistor.

The semiconducting $SrTiO_3$ powder is added to commercially available lead germanate, for example lead germamate $Pb_5Ge_3O_{11}$ marketed by Transelco, USA) so that the mixtures contain (a) 10% by weight, (b) 15% by weight, (c) 20% by weight of lead germanate. The powders are wet-milled for 2 hours in an agate ball mill and granulated by means of a binder (a 10% aqueous polyvinylalcohol solution). The granulate is pressed into tablets having a diameter of 6 mm and a thickness of 0.55 mm to a green density of approximately 50 to 60%. The tablets are sintered in air for 30 min. at a temperature in the range from 1200° to 1300° C.

All the samples which are produced in this way do not show any open porosity any longer after sintering.

Gold layers were applied as electrodes on the above-mentioned chromium nickel alloy bonding layers, for example by vapour deposition.

5. Electric measurements

Figure 2:
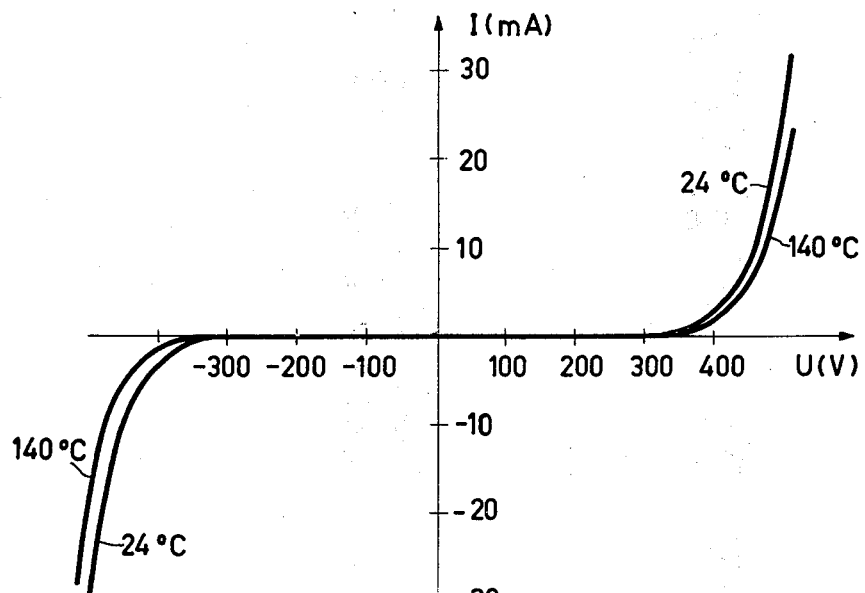

FIG. 2 shows the current-versus-voltage behaviour of a sample which is sintered at 1200° C. and to which 20% by weight of $Pb_5Ge_3O_{11}$ has been added with respect to the weight of a strontium titanate phase, doped with $Bi_2WO_6$ for the temperature range from 24° C. to 140° C.

Figure 3:
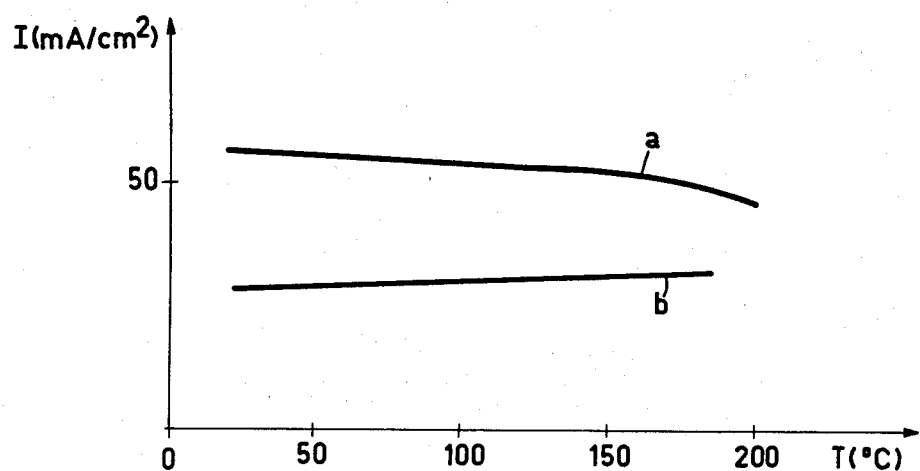

The flow of current through the voltage-dependent resistor of the invention may have, depending on the temperature, both a negative characteristic (see FIG. 3, curve a) and a positive characteristic (see FIG. 3, curve b). Curve a was obtained with a sintered body which is sintered at 1250° C. and contains 10% by weight of $Pb_5Ge_3O_{11}$. Curve b was obtained with a sintered body which is sintered at 1250° C. and contains 15% by weight of $Pb_5Ge_3O_{11}$.

In contradistinction with the temperature dependence of prior art voltage-dependent resistors on the basis of $TiO_2$, SiC or ZnO a higher temperature at a voltage which is kept constant results in a slightly lower current with resistors in accordance with FIG. 3, curve a, so that self-heating of such resistors is less likely than with prior art varistors, in which a higher temperature results in increased currents.

The resistors which were produced in accordance with the method of the invention have all a current-voltage characteristic which can be defined by the formula $U = C.I^\beta$.

The following Table shows the value of the coefficient of non-linearity which is measured on several embodiments which were produced in accordance with the above-described method. The strength of the electric field E is given in KV/cm, a current of 1 mA/cm² flowing through the sample. The material constant C depends on the geometry of the sample: it is therefore replaced in the Table by the value $E_{1\ mA}[KV/cm^2]$.

TABLE (for samples having a diameter of 5 mm and a thickness d of approximately 0.5 mm)

| Sintering temp. $T_S$ | 10 wt. % $Pb_5Ge_3O_{11}$ | | 15 wt. % $Pb_5Ge_3O_{11}$ | | 20 wt. % $Pb_5Ge_3O_{11}$ | |
|---|---|---|---|---|---|---|
| | $\beta E_{1mA}$ | $\left[\frac{KV}{cm}\right]$ | $\beta E_{1mA}$ | $\left[\frac{KV}{cm}\right]$ | $\beta E_{1mA}$ | $\left[\frac{KV}{cm}\right]$ |
| 1200° C. | 0.099 | 8.11 | 0.122 | 6.7 | 0.133 | 6.5 |
| 1250° C. | 0.101 | 8.78 | 0.123 | 7.04 | 0.121 | 7.61 |
| 1300° C. | 0.109 | 8.83 | — | — | — | — |

The values for the non-linearity index for prior art varistors are for SiC: $\beta = 0.15$ to 0.35; $TiO_2: \beta = 0.1$ to 0.18; ZnO: $\beta = <0.003$ (see VALVO Handbuch "spannungsabhängige Widerstände", 1978, page 10). It appears that the non-linearity indices of the varistors of the invention are as good as and better, respectively, than for example the indices of the known varistors on the basis of $TiO_2$ or SiC. The disadvantages of varistors on the basis of ZnO were already mentioned in the preamble of this application.

Figure 4:
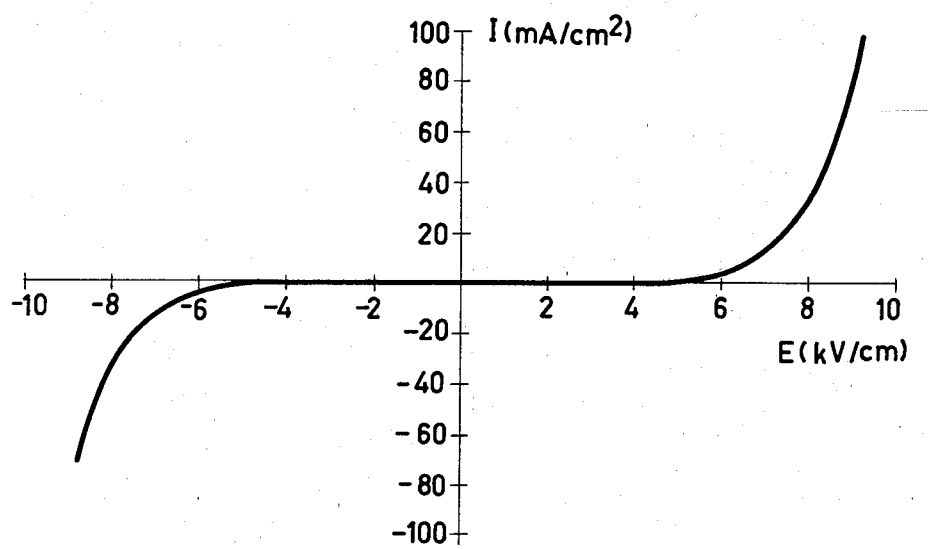

FIG. 4 shows the characteristic of the current passage in dependence on the electrical field strength for a resistor having a resistance body comprising 20% by weight of $Pb_5Ge_3O_{11}$ and sintered at 1200° C.

What is claimed is:

1. A voltage-dependent resistor comprising a ceramic sintered body formed of a polycrystalline alkaline earth metal titanate doped with a small quantity of a metal oxide to produce an N-type conductivity and electrodes provided on opposing parallel surfaces of said sintered body, characterized in that said sintered body comprises a minor quantity of a lead germanate phase defined by the general formula $(PbO)_x:(GeO_2)_y$ in the molar ratio x:y = 5:1 to 1:5.

2. A voltage-dependent resistor as claimed in claim 1, characterized in that the sintered body comprises a minor quantity of a lead germanate phase which is defined by the general formula $(PbO)_x:(GeO_2)_y$ in the molar ratio x:y = 5:1 to 1:4.

3. A voltage-dependent resistor as claimed in claim 1, characterized in that the sintered body comprises a minor quantity of a lead germanate phase which is defined by the general formula $(PbO)_x:(GeO_2)_y$ in the molar ratio x:y = 3:5 to 5:3.

4. A voltage-dependent resistor as claimed in claim 1, characterized in that the alkaline earth metal titanate is strontium titanate $SrTiO_3$.

5. A voltage dependent resistor comprising a ceramic-sintered body consisting of polycrystalline strontium titanate doped with a small quantity of a metal oxide of the formula $(WO)_3(Bi_2O_3)_x$ wherein x equals 0.5 to 3 to produce an n-type conductivity and a minor quantity of a lead germanate phase defined by the general formula $(PbO)_x:(GeO)_y$ in the mole ratio $x:y = 5:1$ to $1:5$ and electrodes provided on opposing surfaces of said sintered body.

6. A voltage dependent resistor comprising a ceramic-sintered body consisting of 65% to 95% by weight of doped strontium titanate, said doped strontium titanate consisting of 90% to 99.8% by weight of $SrTiO_3$ and 0.2% to 10% by weight by $BiWO_6$, and 10% to 35% by weight of $Pb_5Ge_3O_{11}$, and electrodes provided on opposing surfaces of said sintered body.

7. The voltage-dependent resistor of claim 6 wherein the sintered body consists of 65% to 90% by weight of doped strontium titanate, said doped strontium titanate consisting of a mixtures of 90 to 99.5% by weight of $SrTiO_3 + 0.5\%$ to 10% by weight of $Bi_2WO_6$ and 10 to 35% by weight of $Pb_5Ge_3O_{11}$.

8. The voltage-dependent resistor of claim 6 wherein the sintered body consists of 80 to 90% by weight of doped strontium titanate said doped strontium titanate consisting of 98% by weight of $SrTiO_3$ and 2% by weight $Bi_2WO_6$ and 10% to 20% by weight of $Pb_5Ge_3O_{11}$.

* * * * *